(12) United States Patent
Kranz

(10) Patent No.: US 11,692,605 B2
(45) Date of Patent: Jul. 4, 2023

(54) HYDRAULIC SHOCK ABSORBER

(71) Applicant: Rüdiger Kranz, Denkendorf (DE)

(72) Inventor: Rüdiger Kranz, Denkendorf (DE)

( * ) Notice: Subject to any disclaimer, the term of this patent is extended or adjusted under 35 U.S.C. 154(b) by 69 days.

(21) Appl. No.: 17/389,084

(22) Filed: Jul. 29, 2021

(65) Prior Publication Data

US 2023/0035676 A1 Feb. 2, 2023

(51) Int. Cl.
| | | |
|---|---|---|
| *F16F 9/32* | (2006.01) | |
| *F16F 9/34* | (2006.01) | |
| *F16F 9/36* | (2006.01) | |
| *F16F 9/19* | (2006.01) | |
| *F16F 9/18* | (2006.01) | |
| *F16F 9/06* | (2006.01) | |

(52) U.S. Cl.
CPC .............. *F16F 9/3214* (2013.01); *F16F 9/19* (2013.01); *F16F 9/34* (2013.01); *F16F 9/368* (2013.01); *B60G 2202/24* (2013.01); *B60G 2204/62* (2013.01); *B60G 2206/41* (2013.01); *B60G 2500/104* (2013.01); *B60G 2800/162* (2013.01); *F16F 9/061* (2013.01); *F16F 9/182* (2013.01); *F16F 2222/12* (2013.01); *F16F 2228/066* (2013.01); *F16F 2230/30* (2013.01); *F16F 2232/08* (2013.01); *F16F 2234/02* (2013.01)

(58) Field of Classification Search
CPC .... F16F 9/3214; F16F 9/19; F16F 9/34; F16F 9/368; F16F 9/061; F16F 9/182; F16F 2222/12; F16F 2228/066; F16F 2230/30; F16F 2232/08; F16F 2234/02; B60G 2202/24; B60G 2204/62; B60G 2206/41; B60G 2500/104; B60G 2800/162
See application file for complete search history.

(56) References Cited

U.S. PATENT DOCUMENTS

| | | | | |
|---|---|---|---|---|
| 2,599,477 | A * | 6/1952 | Patriquin | F16F 9/48 188/320 |
| 2,699,844 | A * | 1/1955 | McIntyre | F16F 9/348 137/493 |
| 2,911,072 | A | 11/1959 | Schedl et al. | |
| 2,912,069 | A * | 11/1959 | Dillenburger | F16F 9/32 188/322.18 |
| 3,513,947 | A * | 5/1970 | Duckett | F16F 9/185 188/269 |
| 4,396,098 | A | 8/1983 | Petrak | |
| 4,415,146 | A * | 11/1983 | Sitko | F16F 7/09 267/202 |
| 4,735,402 | A * | 4/1988 | Davis | F16F 9/3405 92/9 |

(Continued)

FOREIGN PATENT DOCUMENTS

| | | |
|---|---|---|
| DE | 3202203 A1 | 8/1982 |
| DE | 10321351 A1 | 12/2004 |

(Continued)

*Primary Examiner* — Thomas J Williams
*Assistant Examiner* — James K Hsiao
(74) *Attorney, Agent, or Firm* — The Webb Law Firm

(57) ABSTRACT

A hydraulic shock absorber including a housing and an absorber unit. The absorber unit is movable relative to the housing in the axis direction of an absorber unit middle axis A-A and includes a piston which is arranged on a piston rod and which subdivides the housing into a first and a second working space which is filled with damping fluid.

21 Claims, 7 Drawing Sheets

(56) References Cited

U.S. PATENT DOCUMENTS

| | | | | |
|---|---|---|---|---|
| 4,775,038 A * | 10/1988 | Unnikrishnan | ......... | F16F 9/516 |
| | | | | 188/320 |
| 5,799,759 A * | 9/1998 | Koch | .................... | F16F 9/0245 |
| | | | | 188/300 |
| 5,911,290 A * | 6/1999 | Steed | ....................... | F16F 9/464 |
| | | | | 188/282.4 |
| 7,201,260 B2 * | 4/2007 | Diederich | ............. | F16F 9/3481 |
| | | | | 188/280 |
| 7,293,634 B2 * | 11/2007 | Rova | .................... | F16F 9/3405 |
| | | | | 188/322.22 |
| 7,549,519 B2 * | 6/2009 | Atwater | .................... | F16F 7/09 |
| | | | | 188/322.22 |
| 8,201,669 B2 * | 6/2012 | Ko | ........................ | F16F 9/5126 |
| | | | | 188/282.8 |
| 8,245,823 B2 * | 8/2012 | Zeissner | ................ | F16F 1/328 |
| | | | | 188/322.22 |
| 9,080,634 B2 * | 7/2015 | Nowaczyk | ............. | F16F 9/182 |
| 9,541,153 B2 * | 1/2017 | Park | ....................... | F16F 9/3405 |
| 9,611,915 B2 * | 4/2017 | Park | ....................... | F16F 9/5126 |
| 9,638,280 B2 * | 5/2017 | Nowaczyk | ............. | F16F 9/348 |
| 9,964,171 B2 * | 5/2018 | Firek | ...................... | F16F 9/5126 |
| 10,258,146 B2 * | 4/2019 | Hansen | ................... | A47B 9/10 |
| 2002/0027051 A1 * | 3/2002 | Grundei | ................ | F16F 9/5126 |
| | | | | 188/322.22 |
| 2003/0051957 A1 * | 3/2003 | Lemieux | ................. | F16F 9/504 |
| | | | | 188/322.22 |
| 2004/0245058 A1 * | 12/2004 | Diederich | ............ | F16F 9/3228 |
| | | | | 188/322.15 |
| 2004/0251099 A1 | 12/2004 | Papp et al. | | |
| 2006/0151271 A1 * | 7/2006 | Rova | ..................... | F16F 9/3405 |
| | | | | 188/322.15 |
| 2007/0071990 A1 * | 3/2007 | Suman | ................... | B23K 35/36 |
| | | | | 428/548 |
| 2010/0095837 A1 * | 4/2010 | Suman | ................... | C09D 5/033 |
| | | | | 524/588 |
| 2010/0096229 A1 * | 4/2010 | Azekatsu | ............. | F16F 9/5126 |
| | | | | 188/282.1 |
| 2012/0160624 A1 * | 6/2012 | Katayama | ............... | F16F 9/468 |
| | | | | 188/314 |
| 2017/0268595 A1 * | 9/2017 | Inagaki | ..................... | F16F 9/34 |
| 2018/0135720 A1 * | 5/2018 | De Kock | ............. | F16F 9/3235 |
| 2019/0390730 A1 * | 12/2019 | Russell | ................ | B60G 13/008 |

FOREIGN PATENT DOCUMENTS

| | | |
|---|---|---|
| DE | 60217556 T2 | 10/2007 |
| DE | 102017211300 B3 | 10/2018 |
| JP | S60182539 U | 12/1985 |

* cited by examiner

HYDRAULIC SHOCK ABSORBER

BACKGROUND

Field

The invention relates to a hydraulic shock absorber comprising a housing and an absorber unit, wherein the absorber unit is movable relative to the housing in the axis direction of an absorber unit middle axis and comprises a piston which is arranged on a piston rod, and which subdivides the housing into a first and a second working space which is filled with damping fluid.

Related Art

Hydraulic shock absorbers have been known for some time now and essentially comprise an absorber unit which is movable relative to housing.

DE 602 17 556 T2 discloses a hydraulic shock absorber for motor vehicles which comprises a cylindrical chamber which is closed at one end and in which a piston element is guided in an axially sliding manner, said piston element being carried by a piston rod and on its peripheral surface carrying a surrounding, non-slotted elastic ring element, wherein the peripheral surface of the piston element converges conically in one direction, away from the end of the closed chamber, and the inner surface of the ring element likewise converges conically in the same direction, wherein the ring element furthermore is assembled on the piston element in an axially displaceable manner between a first fixed stop at the end of the element which is closest to the closed end of the chamber, and a second fixed stop on the piston element at a distance to the first stop which exceeds the axial length of the ring element.

SUMMARY

The disadvantage of the aforementioned technical solution is the fact that the conicity of the peripheral surface of the piston element and of the inner surface of the ring element, such conicities being different from one another, must be matched to one another for a good shock absorption and hence a huge expense for the design and manufacture of the individual components is necessary.

It is therefore the object of the invention to overcome the disadvantages which are known from the state of the art and to provide a hydraulic shock absorber which has good response behaviour for the shock absorption.

Concerning a hydraulic shock absorber of the initially mentioned type, this object is achieved by way of the piston having a piston unit which comprises a piston member, said piston member comprising a multitude of piston member flow channels which are suitable for the connection of the first and second working space and being stationary with respect to the piston rod, and a piston ring, said piston ring being coaxially arranged on the piston member in a displaceable manner in the axis direction of the absorber unit middle axis and comprising a piston ring inner lateral surface, wherein a pressure plate which comprises pressure plate flow channels is arranged axially on both sides of the piston unit, said piston unit comprising the piston member which has a piston member outer lateral surface, and is resiliently biased against the piston unit by way of a spring force, so that the piston ring which comprises a piston ring outer lateral surface is arranged between the pressure plates, and wherein the pressure plates are radially dimensioned such that a piston ring end-face which faces the pressure plates projects radially beyond the assigned pressure plate in a manner such that in the operating state the piston ring of the piston unit is displaceable by the damping fluid which presses upon the one piston ring end-face and the pressure plate at the other side is deflected against the spring force by way of the displacement of the piston ring, by which means a flow path through the piston member flow channels and the pressure plate flow channels of the pressure plate at the other side can be released for the throttled flow of the damping fluid between the two workings spaces.

A shock absorber which is designed in such a manner, in comparison to other hydraulic shock absorbers has an improved response behaviour and damping behaviour. Furthermore, the hydraulic shock absorber according to the invention has no bottoming out on account of the high progression.

Further advantageous designs of the preferred hydraulic shock absorber are disclosed herein.

According to an advantageous further development of the hydraulic shock absorber, a pressure plate which comprises pressure plate flow channels and which is resiliently biased against the piston member by way of a spring force is arranged axially on both sides of the piston unit, said piston unit comprising the piston member which has a piston member outer lateral surface. If the pressure plate is only biased against the piston member, there is the possibility of the piston ring having an axial play with respect to the piston member. Advantageously, on account of this, advantages result given a viscosity change of the damping fluid which is caused by a temperature change.

Preferably, the piston ring is or can be designed in a multi-part manner. Particularly preferably, the piston ring comprises a piston support ring which has a piston support ring inner lateral surface and a piston support ring outer lateral surface, and a piston sealing ring which has a piston sealing ring inner lateral surface and a piston sealing ring outer lateral surface. Very particularly preferably, a piston ring seal element for sealing between the piston support ring and the piston sealing ring is arranged or can be arranged in a piston ring groove which is formed in the piston support ring outer lateral surface or in the piston sealing ring inner lateral surface. The multi-part design of the piston ring improves the adaptability of the piston ring to the dimensions of the components, such as housing and piston member, which surround the piston ring.

Furthermore, an inner piston support ring outer lateral surface is designed in a manner set back with respect to an outer piston support ring outer lateral surface, so that a piston sealing ring receiving space opens out, in which space the piston sealing ring can be arranged or is arranged. Advantageously, the piston sealing ring comprise a wall, wherein the wall has a wall thickness, so that the piston ring forms a plane piston ring outer lateral surface by way of the outer piston support ring outer lateral surface and the piston sealing ring outer lateral surface which are arranged to one another.

Furthermore, in a preferred further development of the hydraulic shock absorber, the piston sealing ring outer lateral surface, or the piston ring outer lateral surface are coated with a sealing material for sealing with respect to the housing. In the multi-part design of the piston ring, the piston sealing ring outer lateral surface forms at least a part of the piston ring outer lateral surface. Hereby, the sealing material is preferably polytetrafluoroethylene (PTFE), polyfluoroalkyl compounds (PFA), fluorinated ethylene propylene (FEP), ethylene tetrafluoroethylene copolymer (ETFE) and/or polyvinylidene fluoride (PVDF). On account of the slidingly guided sealing, the piston ring which is arranged coaxially on the piston member is optimally arranged on this in a displaceable manner between the piston member and the housing. The wearing of the seal on operation of the hydraulic shock absorber is furthermore very low, which leads to an increased service life of the hydraulic shock absorber.

According to an additional design of the hydraulic shock absorber according to the invention, a piston member seal element for sealing between the piston member and the piston ring is arranged in a piston member groove which is formed in the piston member outer lateral surface or in the piston ring inner lateral surface. In a multi-part design of the piston ring, a piston member seal element for sealing between the piston member and the piston support ring is preferably arranged in the piston member groove which is formed in the piston member outer lateral surface or in the piston support ring insert lateral surface. The installation of the piston member seal element and the piston ring seal element increases the sealedness between the individual components of the piston unit and thus improves the damping behaviour of the hydraulic shock absorber. Advantageously, the piston member flows channels are arranged in an equally distributed manner in the circumferential direction about the absorber unit middle axis. The equal distribution in the circumferential direction improves the damping characteristics since the damping fluid can flow to and from between the working spaces in an equally distributed manner around the periphery of the hydraulic shock absorber. According to a further development of the hydraulic shock absorber according to the invention, the piston member flow channels are designed as a bore.

Further advantageously, the pressure plate flow channels are arranged in an equally distributed manner in the circumferential direction about the absorber unit middle axis. The equal distribution in the circumferential direction improves the damping characteristics, since the damping fluid can flow to and from between the working spaces in an equally distributed manner around the periphery of the hydraulic shock absorber. According to a further development of the hydraulic shock absorber in accordance with the invention, the pressure plate flow channels are designed as a bore. The working spaces are separate from one another, so that given a closed bypass channel the damping fluid can flow between the workings spaces exclusively via the piston member flow channels. The pressure plates are preferably resiliently biased against the piston member by way of spring elements. The spring elements are particularly preferably designed as compression springs, flat springs and/or corrugated springs. Very particularly preferably, the spring element is distanced to the piston member by way of a spacer sleeve for limiting the biasing of the pressure plate. By way of this, a change in the biasing upon the pressure plates is possible in a simple and rapid manner, for example by way of the exchange of the spring elements. The pressure plates however can also be designed resilient per se.

Furthermore, the hydraulic shock absorber is preferably provided with an electromagnetic damping adjustment unit which permits the damping of the hydraulic shock absorber to be influenced, in particular by way of the adjustment of the spring hardness of the spring elements, so that the damping is adjustable or can be adjusted. Such an adjustment is preferably possible by way of software.

According to an additional advantageous design of the hydraulic shock absorber according to the invention, the piston ring has an axial play between the pressure plates. The axial play between the pressure plates is preferably up to 1 mm, preferably between $1/100$ mm and $5/10$ mm, particularly preferably between $1/100$ mm and $1/10$ mm.

It is further advantageous if the piston member and piston ring are manufactured of different materials. Advantageously, the piston ring is manufactured for example of plastic and the piston member of aluminium. The different materials of the piston member and the piston ring should be selected to the extent that the material from which the piston ring is manufactured has a higher coefficient of thermal expansion than the material from which the piston member is manufactured.

The material from which the piston ring is manufactured preferably has a coefficient of thermal expansion which is adapted to the viscosity of the damping fluid. Particularly preferably, the piston support ring of the piston ring has coefficients of thermal expansion which are adapted to the viscosity of the damping fluid. By way of this, the piston ring or the piston support ring in the case of a heating of the damping fluid has a greater expansion in comparison to the piston member. Given the heating of the damping fluid, the axial play of the piston ring with respect to the piston member reduces on account of the greater expansion of the piston ring, preferably of the piston support ring. Given a heating of the damping fluid, the viscosity of the damping fluid drops, and the damping fluid becomes more flowable. The inlet areas in the piston member outer lateral surface which are significant for the feed of the damping fluid reduce due to the expansion of the piston ring, preferably of the piston support ring, on account of the lower axial play, by which means less damping fluid which is now more flowable can flow between the two working spaces. Thus, a temperature/force ratio which remains constant results and no losses of the damping occur despite the viscosity of the damping fluid changing with the temperature.

For the flow path, the piston member preferably comprises piston member flow channels which are constructionally separate from one another, for the throttled flow transfer of the damping fluid in a flow direction between the two working spaces. By way of the constructional separation of the piston member flow channels, a simpler design of the piston of the absorber unit is rendered possible.

Furthermore, the piston member flow channels comprise an axial piston member flow channel outlet section and an axial piston member flow channel inlet section, wherein the piston member flow channel inlet section is open towards the piston member outer lateral surface.

According to a further additional design, a piston member flow channel can be designed or is designed as a piston member flow groove in the piston member outer lateral surface. By way of a corresponding design of the piston member flow channel as a piston member flow groove, the manufacture of the piston member flow channels is simpler and less time-consuming. Furthermore, the piston member can thus assume any arbitrary shape and hence be designed for example in a star-shaped, polygonal manner.

According to an additional development of the hydraulic shock absorber according to the invention, the pressure plate flow channels comprise an axial pressure plate flow channel outlet section and an axial pressure plate flow channel inlet section, wherein the pressure plate flow channel outlet section is open towards a pressure plate outer lateral surface. By way of this, the flowing-out of the damping fluid into the respective working space is optimised by way of the outflow area, which is available to the damping fluid being enlarged, so that the damping fluid flows rapidly between the two working spaces.

The invention is hereinafter explained in more detail by way of the accompanying drawing. Herein, the features which are mentioned in the claims, the description, and the drawing, each individually per se or in any other meaningful combination can be essential to the invention.

DETAILED DESCRIPTION

Figure 1:
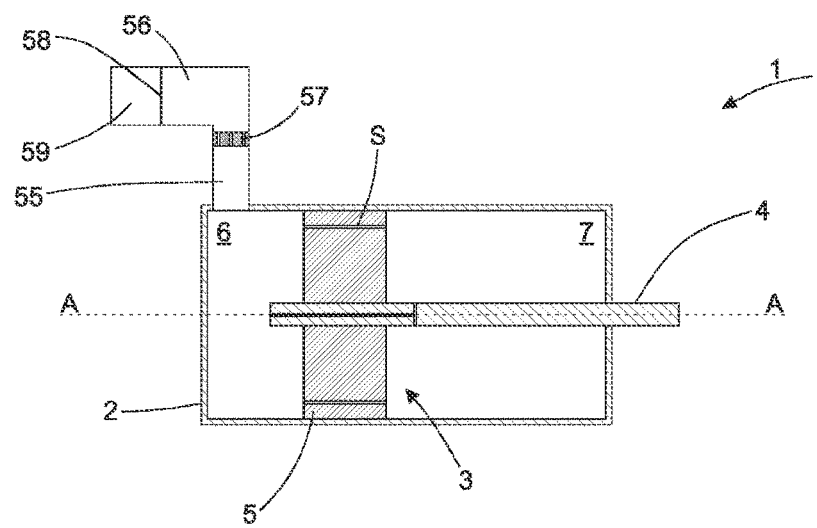
FIG. 1 a schematic representation of a preferred hydraulic shock absorber.

FIG. 1 shows a schematic representation of a preferred hydraulic shock absorber 1.

The hydraulic shock absorber 1 comprises a housing 2 and an absorber unit 3 (rebound stage). The absorber unit 3 is movable relative to the housing 2 in the axis direction of an absorber unit middle axis A-A and comprises a piston 5 which is arranged on a piston rod 4. Hereby, the piston 5 divides the housing 2 into a first workings space 6 which is filled with damping fluid and into a second workings space 7 which is filled with damping fluid. The two working spaces 6, 7 are connected to one another by way of a multitude of flow channels S which pass through the piston 5. The flow channels S form a flow path for the throttled flow transfer of the damping fluid in a flow direction between the two working spaces 6, 7.

Given a damping which is initiated by an impact, the absorber unit 3 is displaced relative to the housing 2 in the axis direction of the absorber unit middle axis A-A and the damping fluid of the hydraulic shock absorber 1 flows through the flow channels S of the piston 5 in a throttled manner in a flow direction between the two working spaces 6, 7.

The number and cross-sectional area of the flow channels S significantly determine the damping behaviour of the hydraulic shock absorber 1, since by way of this an influence is exerted upon the throttled flow of the damping fluid between the two workings spaces 6, 7. A larger number of flow channels S given a constant cross-sectional area of the flow channels S increases the total cross-sectional area for the damping fluid given the flow between the two workings spaces 6, 7. If in contrast the cross-sectional area of the flow channels S is reduced given a constant number of flow channels S, the total cross-sectional area for the damping fluid drops given the flow between the two working spaces 6, 7. By way of such an adaptation, amongst other things a targeted influence upon the damping behaviour of the hydraulic shock absorber can be made. Furthermore, the hydraulic shock absorber 1 preferably has a equalisation container 56 which is connected to the working space 6 via a connection conduit 55. A valve arrangement 57 which with regard to its design corresponds to that of the piston 5 of the absorber unit 5 is arranged in the connection conduit 55. If the piston of the hydraulic absorber unit 5 springs in, then on account of the plunging of the piston rod 4, the damping fluid which is under pressure is displaced out of the workings space 6 and flows via flow channels S into the working space 7 and via the valve arrangement 57 which is arranged in the connection conduit 55 into the equalisation container 56. The piston 5 of the absorber unit 3 and the valve arrangement 57 are preferably designed identically. Accordingly, in the embodiment example, the valve arrangement 57 preferably corresponds to the piston 5 of the absorber unit 3. The equalisation container 56 comprises a equalisation means 58 which is biased, for example a membrane which on rebounding displaces the damping fluid out of the equalisation container 56 into the working space 6. The equalisation means 58 is preferably biased by a gas, particularly preferably nitrogen ($N_2$) or another inert gas, which is located in a gas space 59.

Figure 2:
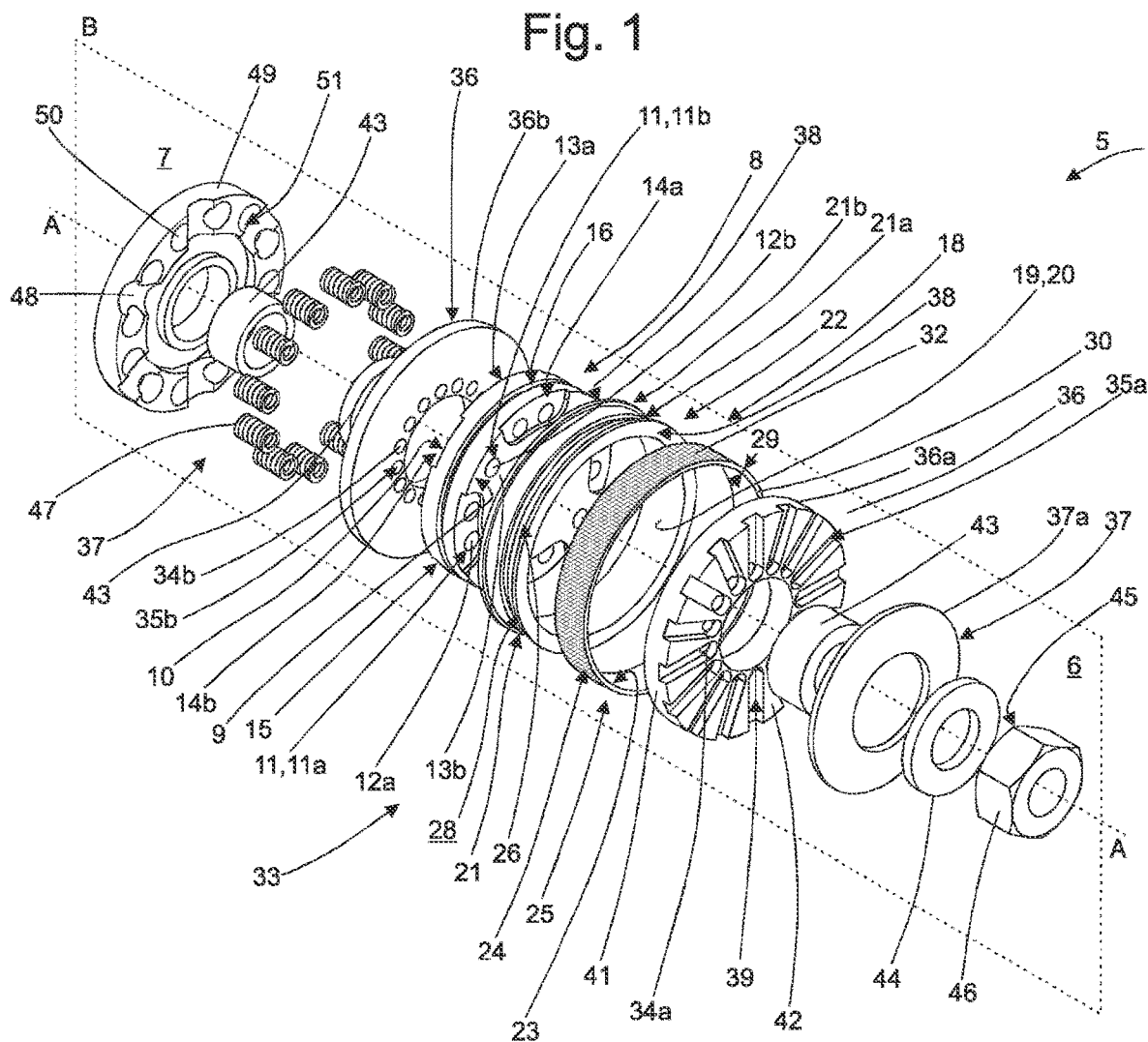
FIG. 2 an exploded representation of the individual parts of a piston of an absorber unit of the preferred hydraulic shock absorber in a perspective view with a section plane B-B which runs through the absorber unit middle axis A-A, FIG. 3 an exploded representation of the individual parts of the piston of the absorber unit of the preferred hydraulic shock absorber in a perspective view in a reverse sequence of the individual parts to FIG. 2 from the left to the right, FIG. 4 an exploded representation of the individual parts of the piston of the absorber unit of the preferred hydraulic shock absorber, said piston being arranged on the piston rod, in a lateral view, FIG. 5 an exploded representation of the individual parts of the piston of the absorber unit, said piston being arranged on a piston rod, in a detail of the housing of the preferred hydraulic shock absorber in a longitudinal section through a section plane B which runs through the absorber unit middle axis A-A, FIG. 6 a lateral view of the piston of the absorber unit of the preferred hydraulic shock absorber, FIG. 7 a representation of the piston of the absorber unit of the preferred hydraulic shock absorber according to FIG. 6, said piston being arranged on the piston rod, in a longitudinal section through a section plane B which runs through the absorber unit middle axis A-A, FIG. 8 a representation of the preferred hydraulic shock absorber in a longitudinal section through a section plane B which runs through the absorber unit middle axis A-A, with a flow path between the second and first working space, said flow path being marked in the flow direction of a damping fluid, in the operating state and FIG. 9 a representation of the preferred hydraulic shock absorber in a longitudinal section through a section plane B which runs through the absorber unit middle axis A-A, with a flow path between the first and the second workings space, said flow path being marked in the flow direction of a damping fluid, in the operating state.

An exploded representation of the individual parts of the piston 5 of the absorber unit 3 of the preferred hydraulic shock absorber 1 is represented in a perspective view in FIG. 2 with a section plane B which runs through the absorber unit middle axis A-A.

The hydraulic shock absorber 1 which is represented in the embodiment example comprises a cylinder-shaped housing 2.

The piston 5 comprises a piston member 8 which is stationary with respect to the piston rod 4 which is not represented. The piston member 8 has a first piston member end-face 9 which faces the first working space 6 and a second piston member end-face 10 which faces the second workings space 7.

In the embodiment example, the piston member 8 comprises a multitude of piston member flow channels 11 which are suitable for the connection of the first and the second working space 6, 7. The piston member flow channels 11 are arranged in a uniformly distributed manner in the circumferential direction about the absorber unit middle axis A-A.

For the flow path for the throttled flow of the damping fluid in a flow direction between the two workings spaces 6, 7, the piston member 8 comprises piston member flow channels 11a, 11b which are constructionally separate from one another. In the embodiment example, the piston member flow channels 11 are designed as a bore 12 and comprise an axial piston member flow channel outlet section 13 and an axial piston member flow channel inlet section 14, wherein the piston member flow channel inlet section 14 is open towards the piston member outer lateral surface 15.

In the embodiment example, the piston member flow channel 11a is designed as two bores 12a which permit a throttled flow of the damping fluid with a flow direction from the first piston member end-face 9 which faces the first working space 6 in the axis direction of the absorber unit middle axis A-A to the second piston member end-face 10 which faces the second working space 7. The piston member 8 in the embodiment example comprises four piston member flow channels 11a. The number of the piston member flow channels 11a which penetrate through the piston 5 is freely selectable, for example one, two, three, four, five, six seven, eight or more flow channels 11a with an arbitrary number of bores 12a is possible.

Furthermore, the piston member flow channel 11b is designed as a bore 12b. The piston member flow channel 11b permits a throttled flow of the damping fluid with a flow direction from the second piston member end-face 10 which faces the second working space 7, in the axis direction of the absorber unit middle axis A-A to the first piston member end-face 9 which faces the first workings space 6. The piston member 8 in the embodiment example likewise comprises four piston member flow channels 11b. The number of the piston member flow channels 11b which penetrate through the piston 5 is also freely selectable, for example one, two, three, four, five, six, seven, eight or more flow channels 11b within arbitrary number of bores 12b is possible.

The piston member flow channels 11a and 11b, as shown in the embodiment example, are preferably arranged in an alternating and equally distributed manner in the circumferential direction about the absorber unit middle axis A-A.

A different flow behaviour can be created on account of the different cross-sectional area of the piston member flow channels 11, by which means the damping behaviour of the preferred hydraulic shock absorber 1 can be adapted to differing demands, such as for example to the terrain to be travelled over. Hereby, a small cross-sectional area of the piston member flow channel 11 leads to a large flow resistance to the damping fluid and thus to a harder damping behaviour of the preferred hydraulic shock absorber 1.

The piston member flow channel 11 can be designed in the most varied of shapes and can be designed or is designed for example also as a piston member flow groove in the piston member outer lateral surface 15.

A piston member groove 16 is formed in the piston member outer lateral surface 15 in the embodiment example, in which groove a piston member seal element 17 which is not shown in FIG. 2 is arranged for sealing between the piston member 8 and a piston ring 18 which is designed of several parts in the embodiment example.

The piston ring 18 which comprises a piston ring inner lateral surface 19 is arranged coaxially on the piston member 8 in a displaceable manner in the axis direction of the absorber unit middle axis A-A. In the embodiment example, the piston ring 18 comprises a piston support ring 22 which has a piston support ring inner lateral surface 20 and a piston support ring outer lateral piston surface 21, and a piston sealing ring 25 which has a piston sealing ring inner lateral surface 23 and a piston sealing ring outer lateral surface 24.

A piston ring seal element 27 for sealing between the piston support ring 22 and the piston sealing ring 25 is arranged in a piston ring groove 26 which is formed in the piston support ring outer lateral surface 21.

The piston support ring outer lateral surface 21 comprises an inner piston support ring outer lateral surface 21a and an outer piston support ring outer lateral surface 21b. The inner piston support ring outer lateral surface 21a is designed in a manner in which it is set back with respect to an outer piston support ring outer lateral surface 21b, so that a piston sealing ring receiver space 28 in which the piston sealing ring 25 can be arranged opens out. Hereby, the piston sealing ring 25 has a wall 30 which has a wall thickness 29 such that the piston ring 18 forms a plane piston ring outer lateral surface 31 which is not shown here, by way of the piston sealing ring outer lateral surface 24 and an outer piston support ring outer surface 21 which are arranged to one another.

In the embodiment example, the piston sealing ring outer lateral surface 24 is coated with a sealing material 32 for sealing with respect to the housing 2 which is not shown. It is alternatively possible for the piston ring outer lateral surface 31, comprising the piston sealing ring outer lateral surface 24 and the outer piston support ring outer lateral surface 21b to be coated with a sealing material 32 for sealing with respect to the housing 2.

Preferably for example polytetrafluoroethylene (PTFE), polyfluoroalkyl compounds (PFA), fluorinated ethylene propylene (FEP), ethylene tetrafluoroethylene copolymer (ETFE) and/or polyvinylidene fluoride (PVDF) is used for coating the piston sealing ring outer lateral surface 24 or the piston ring outer lateral surface 31.

The piston member 8 and the piston ring 18 together form the piston unit 33.

In each case a pressure plate 36 which comprises pressure plate flow channels 35 which in the embodiment example are designed as a bore 34 is arranged axially on both sides of the piston member 8 which comprises the piston member outer lateral surface 15. The piston ring 18 which is displaceably arranged on the piston member 8 preferably has an axial play between the pressure plates 36, wherein the axial play between the piston ring 18 and the pressure plates is up to 1 mm, preferably between $1/100$ mm and $5/10$ mm, particularly preferably between $1/100$ mm and $1/10$ mm.

The pressure plates 36 are resiliently biased against the piston member 8 by way of spring elements 37 which have a spring force, wherein the spring elements 37 are preferably designable as compression springs, such as for example a helical spring, cone spring (conical compression spring), barrel spring (double-conical compression spring), as a flat spring such as for example a disc spring or spring disc and/or as a corrugated spring. The pressure plates 36 can also be designed as spring means which are resilient per se, wherein the pressure plates 36 are preferably biased with respect to the piston unit 33, in particular with respect to the piston member, by way of spring elements 37.

The piston ring 18 which comprises a piston ring outer lateral surface 31 is arranged between the pressure plates 36.

The pressure plates 36 are radially dimensioned such that a piston ring end-face 38 which faces the pressure plates 36 projects radially beyond the assigned pressure plate 36 in a manner such that in the operating state the piston ring 18 is displaceable by way of the damping fluid which presses upon the one piston ring end-face 38 and the pressure plate 36 on the other side is deflected counter to the spring force by way of the displacement of the piston ring 18, by which means a flow path for the throttled flow of the damping fluid between the two working spaces 6, 7 can be released through the piston member flow channels 11 and the pressure plate flow channels 35 of the pressure plate 36 at the other side.

In the embodiment example of a cylinder-shaped hydraulic shock absorber, an annular gap therefore forms between the housing 2 and the pressure plate 36, the base surface of said annular gap being designed as part of the piston ring end-face 38.

In the embodiment example, the pressure plates 36 which surround the piston member 8 and the piston ring 18 are designed differently. The pressure plate 36a comprises pressure plate flow channels 35a which are designed as a bore 34a, and which have an axial pressure plate flow channel outlet section 39 and an axial pressure plate flow channel inlet section 40 which is not shown here. The pressure plate flow channel outlet section 39 is hereby open towards a pressure plate outer lateral surface 41 of the pressure plate 36a and towards a pressure plate end-face 42 which is away from the piston member 8. The pressure plate flow channels 35a of the pressure plate 36a are arranged in an equally distributed manner in the circumferential direction about the absorber unit middle axis A-A in the manner of a bolt circle. The pressure plate flow channel outlet sections 39 are furthermore designed in a fan-like manner around the absorber unit middle axis A-A.

The pressure pate 36b comprises pressure plate flow channels 35b which are designed as a bore 34b and which are arranged in an equally distributed manner in the circumferential direction about the absorber unit middle axis A-A likewise in the manner of a bolt circle.

The pressure plate flow channels 35 are arranged in the pressure plates 36a and 36b in a manner such that the piston member flow channels 11 are sealed off with respect to the piston member end-faces 9, 10 which face the pressure plates 36a and 36b.

The pressure plate flow channel 35 can be designed in the most varied of shapes and are also designable or designed for example as a pressure plate flow groove in the pressure plate outer lateral surface 41.

The spring element 37 is distanced to the piston member 8 by way of a spacer sleeve 43, for limiting the biasing of the pressure pate 36. In the embodiment example, two different spring elements 37a and 37b are used for biasing the pressure plates 36a and 36b.

The spring element 37a is designed as a disc spring. The spring element 37a is fixed with respect to the piston rod 4 which is not shown, by way of a washer 44 and a nut 46 which serves as a stop 45.

The spring element 37b is designed in a multi-part manner and in the embodiment example comprises twelve helical springs 47, as spacer sleeve 43 and a support plate 49 which comprises support plate flow channels 48 which are formed transversely to the absorber unit middle axis A-A. The support plate flow channels 48 improve the flowing-out of the damping fluid into the respective working space 6, 7.

Furthermore, the hydraulic shock absorber is preferably provided with an electromagnetic damping adjustment unit which permits the damping of the hydraulic shock absorber to be influenced, in particular by way of adjusting the spring hardness of the spring elements, so that the damping is adjustable or can be adjusted. Such an adjustment is rendered possible externally preferably by way of software and can be carried out manually, for example by way of pressing a button or the like.

Receivers 51 which are designed as blind holes 50 and which at least partly receive the helical springs 47 and position them relative to the pressure plate 36b are formed in the support plate 49. The receivers 51 are arranged in an equally distributed manner in the circumferential direction about the absorber unit middle axis A-A in the manner of a bolt circle.

Receivers for receiving the helical springs 47 can likewise be formed in the pressure plate 36b. In the embodiment example, no receivers are provided in the pressure plate 36b. The support plate 49 is fixed by a stop 52 of the piston rod 4 which is not shown in FIG. 2.

The biasing which acts upon the pressure plates 36a and 36b can therefore be infinitely adjusted by way of actuation of the nut 46 in dependence on the respectively applied spacer sleeve 43. The spacer sleeve 43 limits the biasing which can be maximally exerted upon the pressure plates 36.

Furthermore, the absorber unit 3 of the hydraulic shock absorber 1 comprises a bypass channel 60 which is formed in the piston rod 4 and which is not represented here. The flow through the bypass channel 60 can be adjusted by way of a valve 61, preferably a needle valve, which is likewise not shown. If the bypass channel 60 which arranged in the piston rod 4 is closed, then a degressive characteristic line and the maximal possible rebound damping are achieved. The damping is effected via the preset spring elements 37 and the through-flow of the damping fluid at the piston 5. A sporty, firm tuning of the rebound stage results from this, such helping in controlling the rolling and pitching movements of the vehicle. If the bypass channel 60 which is arranged in the piston rod 4 is opened, then a progressive characteristic line and the lowest possible rebound damping are achieved. The quantity of damping fluid which flows through the bypass channel 60 is no longer available to the piston 5 and the damping forces are reduced by way of this. A reduced rebound damping increases the travel comfort.

When the piston 5 of the hydraulic shock absorber 1 springs in, then by way of the plunging of the piston rod 4 the damping fluid which is under pressure is displaced out of the working space 6 and flows via the piston member flow channels 11 into the working space 7 and via the valve arrangement 57 which is preferably designed as a check valve into an equalisation container 56. In the embodiment example, the valve arrangement 57 and the piston 5 of the absorber unit 3 are designed in a constructional identical manner, wherein the rebound stage has no spring force. On compressing, the damping fluid flows through the compression stage of the piston 5 of the absorber unit from the working space 6 into the working space 7 and simultaneously through the compression stage of the valve arrangement 57 into the equalisation container 56. On rebounding, the damping fluid flows through the rebound stage of the valve arrangement 57 which has no or only a minimal spring force, from the equalisation chamber 56 back into the working space 6 and from the working space 6 through the rebound stage of the piston 5 of the absorber unit 3 back into the working space 7.

By way of the adjustment of the respective bypass channel in the piston rod 4 or in the valve arrangement, the damping behaviour can advantageously be adapted further. A sporty, firm tuning is achieved by closed bypass channels and the travel comfort is increased by way of opened bypass channels.

The working spaces 6, 7 are separated from one another, so that given a closed bypass channel 60 which is arranged in the piston rod 4, the damping fluid can flow exclusively via the piston member flow channels 11 from the one into the other working space 6. 7.

Figure 3:
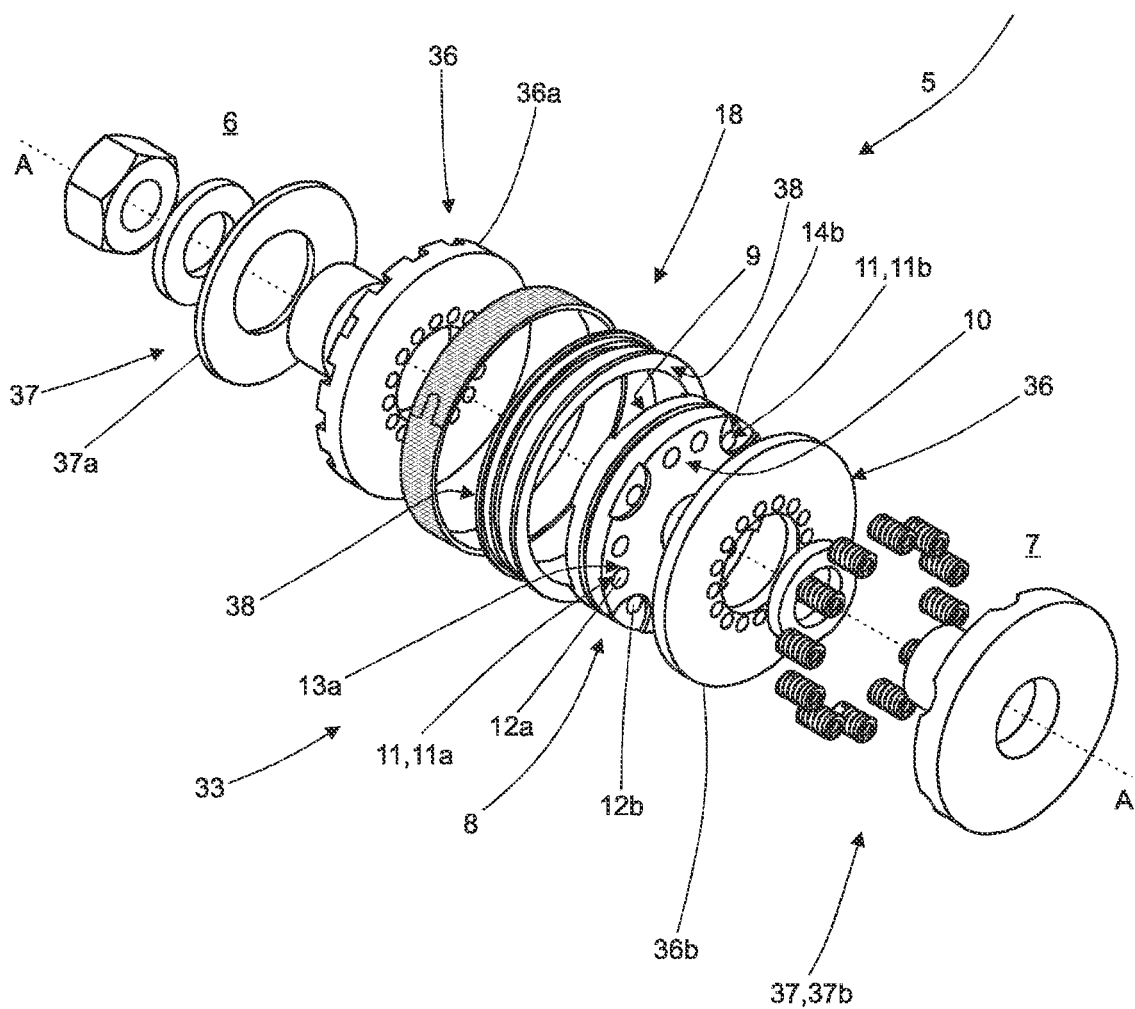

FIG. 3 represents an exploded representation of the individual parts of the piston 5 of the absorber unit 5 of the preferred hydraulic shock absorber 1 in a perspective view in a sequence of the individual parts which from the left to the right is the reverse of FIG. 2.

The piston member 8 is thus represented from the piston member end-face 10.

As already explained concerning FIG. 2, the piston member 8 comprises a multitude of piston member flow channels 11 which are suitable for the connection of the first and second working space 6, 7. These are arranged equally distributed in the circumferential direction about the absorber unit middle axis A-A and are constructionally separate from one another in a flow direction of the damping fluid between the two workings spaces 6, 7.

The piston member flow channels 11$b$ which permit a throttled flow of the damping fluid with a flow direction from the second piston member end-face 10 which faces the second working space 7, in the axis direction of the absorber unit middle axis A-A to the first piston member end-face 9 which faces the first working space 6 is shown in FIG. 3 with their piston member flow channel inlet section 14$b$ and also the piston member flow channels 11$a$ with their piston member flow channel outlet section 13$a$. The piston member 8 in the embodiment example comprises four piston member flow channels 11$a$ and four piston member flow channels 11$b$ with arbitrary amount of bores 12$a$ The number of piston member flow channels 11$a$ and 11$b$ which pass through the piston 5 can be freely selected, wherein one, two, three, four, five, six, seven, eight or more flow channels 11 and with an arbitrary amount of bores 12$b$ are possible.

The piston member flow channels 11$a$ and 11$b$ are arranged in a uniformly distributed and alternating manner in the circumferential direction about the absorber unit middle axis A-A.

The piston ring 18 is arranged coaxially on the piston member 8 in a displaceable manner in the axis direction of the absorber unit middle axis A-A.

The piston member 8 and the piston ring 18 form the piston unit 33 and are arranged between the pressure plates 36, wherein the pressure plate 36 in the other side is also displaced by way of a displacement of the piston ring 18 on account of the damping fluid which is present at piston ring end-face 38, so that the damping fled can flow between the working spaces 6, 7.

The pressure plates 36 are resiliently biased against the piston unit 33, preferably against the piston member 8, by way of spring elements 37 which exert a spring force.

Figure 4:
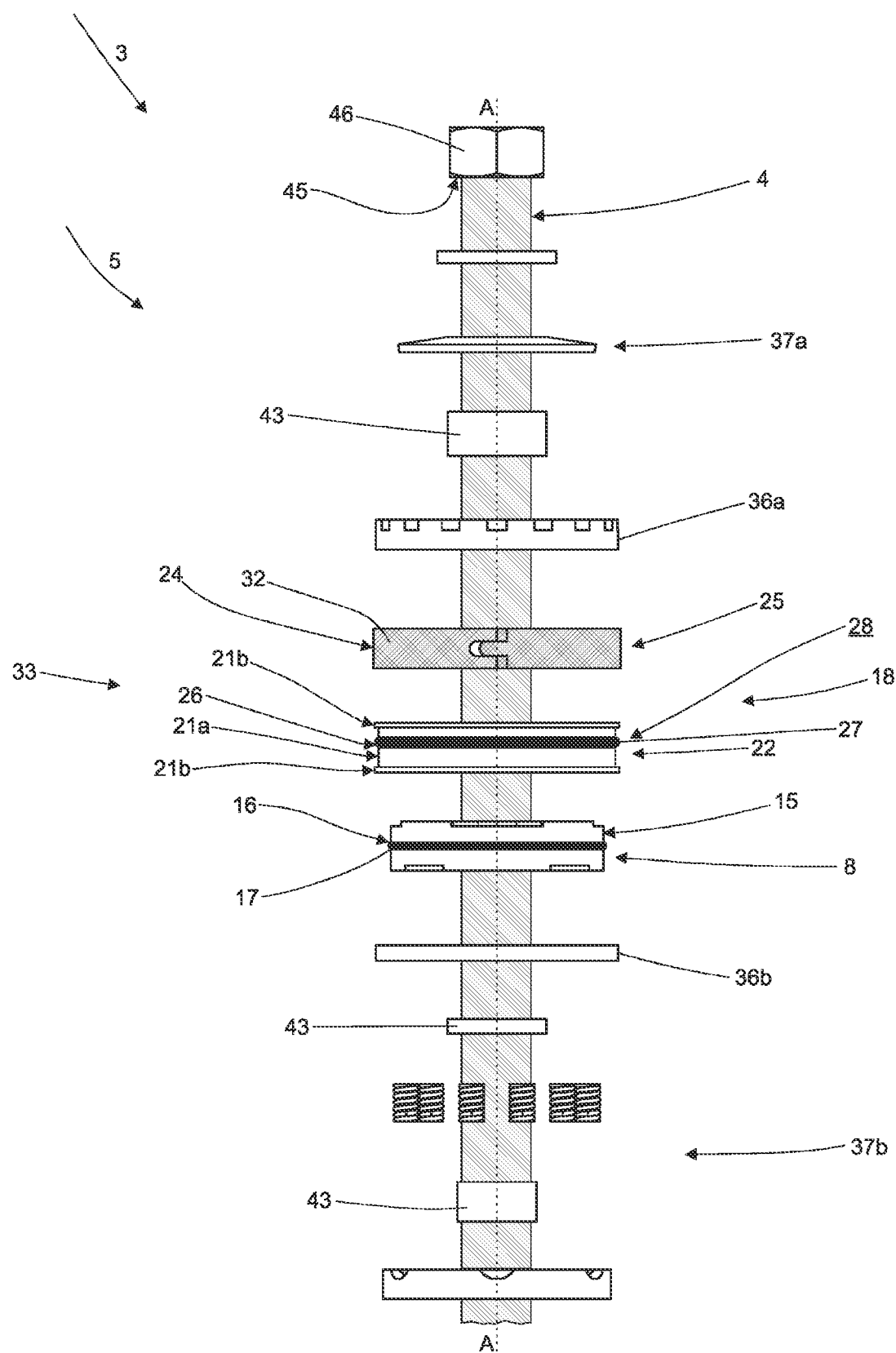

An exploded representation of the individual parts of the piston 5 of the absorber unit 3 of the preferred hydraulic shock absorber 1, said piston being arranged on the piston rod 4, is shown in FIG. 4. The piston member 8 comprises a piston member groove 16 in the piston member outer lateral surface 15, in which groove the piston member seal element 17 is arranged. The piston member seal element 17 seals between the piston member 8 and the piston ring 18.

The piston ring 18 is designed in a multi-part manner in the embodiment example and comprises the piston support ring 22 and the piston sealing ring 25.

The piston support ring 22 has an inner piston support ring outer lateral surface 21$a$ and an outer piston support ring outer lateral surface 21$b$. The inner piston support ring outer lateral surface 21$a$ is designed set back with respect to an outer piston support ring outer lateral surface 21$b$, so that a piston sealing ring receiving space 28 opens out. The piston sealing ring 25 can be arranged in the piston sealing ring receiving space 28. The piston ring seal element 27 which seals between the piston support ring 22 and the piston sealing ring 25 is positioned between the piston support ring 22 and the piston sealing ring 25, in a piston ring groove 26 which is arranged in the inner piston support ring outer lateral surface 21.

In the embodiment example, the piston sealing ring outer lateral surface 24 is coated with a sealing material 32 for the sealing with respect to the housing 2 which is not shown. Preferably for example PTFE, PFA, FEP, ETFE and/or PVDF is applied as a sealing material 32 for the coating of the piston sealing ring outer lateral surface 24.

The piston member 8 and the piston ring 18 which is arranged coaxially on the piston member 8 in a displaceable manner in the axis direction of the absorber unit middle axis A-A form the piston unit 33 which is arranged between the pressure plates 36$a$ and 36$b$. The pressure plates 36 are resiliently biased against the piston unit 33, in particular the piston member 8 by way of a spring element 37$a$ and 37$b$ which exerts a spring force.

The biasing which in the embodiment example is infinitely adjustable by way of the nut 46 which comprises a stop 45, and which acts upon the pressure plate 36 is limited by the spacer sleeve 43 which is arranged between the spring element 37 and the piston unit 33, preferably the piston member 8.

Figure 5:
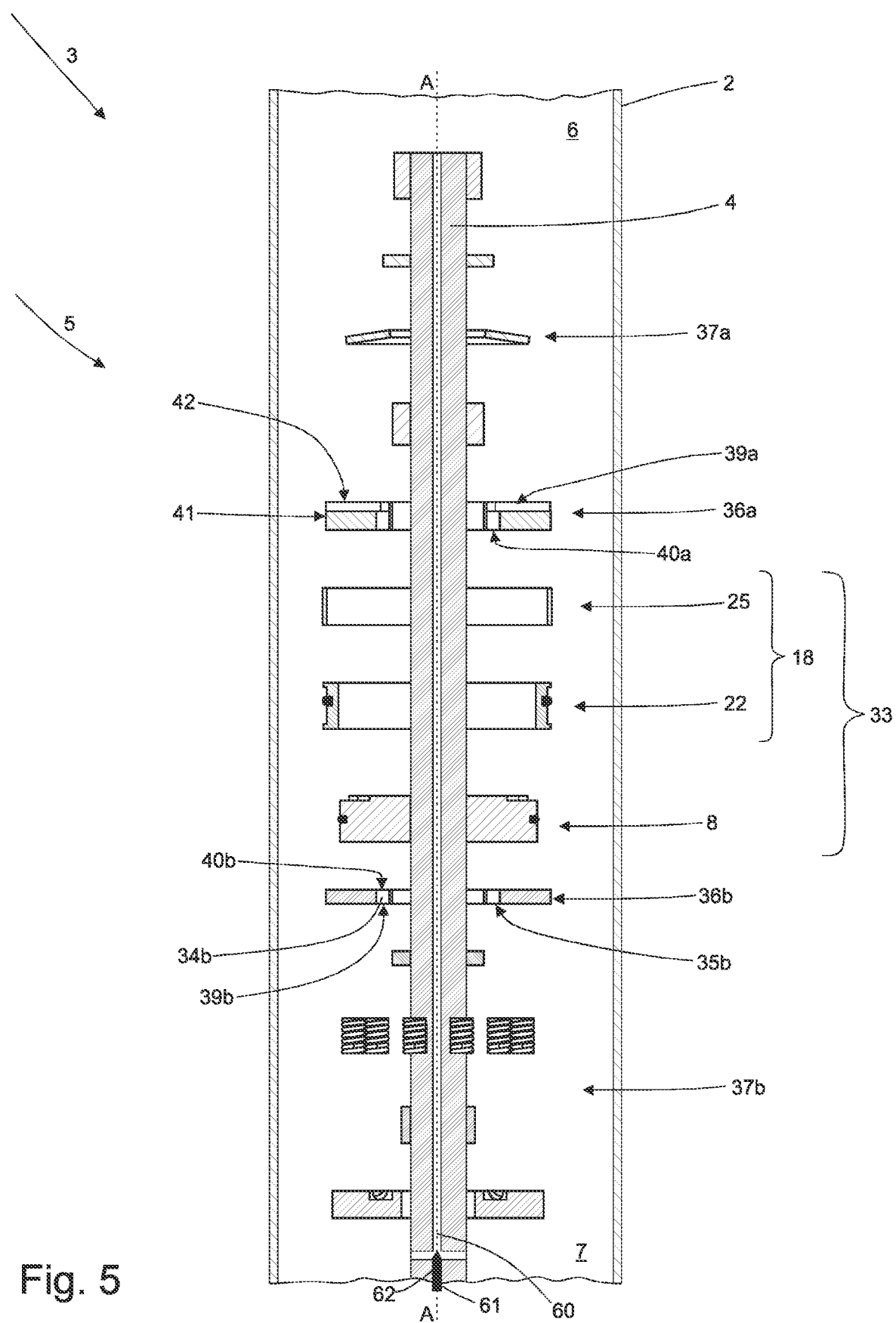

An exploded representation of the individual parts of the piston 5 of the absorber unit 3, said piston being arranged on the piston rod 4, is represented in FIG. 5 in a detail of the housing 2 of the preferred hydraulic shock absorber 1 in a longitudinal section through a section plane B which runs through the absorber unit middle axis A-A.

The piston unit 33, designed as a piston member 8 and in a multi-part manner as a piston ring 19 which comprises the piston support ring 22 and the piston sealing ring 25 is arranged between the pressure plates 36 which are biased against the piston unit 33, in particular against the piston member 8 by way of spring elements 37 which exert a spring force.

The pressure plate 36$a$ comprises pressure plate flow channels 35$a$ which are designed as a bore 34$a$. The pressure plate flow channels 35$a$ of the pressure plate 36$a$ comprise a pressure plate flow channel outlet section 39$a$ and a pressure plate flow channel inlet section 40$a$. The pressure plate flow channel outlet section 39$a$ is hereby open towards a pressure plate outer lateral surface 41 of the pressure plate 36$a$ and to a pressure plate end-face 42 which is away from the piston member 8. An improved outflow into the respective working space 6, 7 is achieved by way of this.

The pressure plate 36$b$ comprises pressure plate flow channels 35$b$ which are designed as a bore 34$b$, with a pressure plate flow channel outlet section 39$b$ and with a pressure plate flow channel inlet section 40$b$.

Furthermore, the damper unit 3 of the hydraulic shock absorber 1 comprises a bypass channel 60 which is formed in the piston rod 4. The flow through the bypass channel 60 can be adjusted by way of a valve 61, preferably a needle valve 61. If the bypass channel 60 which is arranged in the piston rod 4 is closed, then a digressive characteristic line and a maximal possible rebound damping are achieved. The damping is effected via the pre-adjusted spring elements 37 and the through-flow of the damping fluid at the piston 5. A sporty, firm tuning of the rebound phase results from this, and this helps in controlling pitching and rolling movements of the vehicle. If the bypass channel 60 which is arranged on the piston rod 4 is opened, then a progressive characteristic line and the least possible rebound damping are achieved. The quantity of damping fluid which flows through the bypass channel 60 is no longer available to the piston 5 and the absorber forces are reduced by way of this. A reduced rebound damping increases the travel comfort. If the piston 5 of the hydraulic shock absorber 1 springs in, then by way of the plunging of the piston rod 4 the damping fluid which is under pressure is displaced out of the working space 6 and flows via the piston member flow channels 11 into the working space 7 and via the valve arrangement 57 which is preferably designed as a check valve into a equalisation container 56. In the embodiment example, the valve arrangement 57 and the piston 5 of the absorber unit 3 are designed in a constructionally identical manner, wherein the rebound stage has no spring force. Accordingly, in the embodiment example the valve arrangement 57 preferably corresponds to the piston 5 of the absorber unit 3, wherein the valve arrangement 57 is dimensioned smaller than the piston 5. On compressing, the damping fluid flows through the compression stage of the piston 5 of the absorber unit from the working space 6 into the working space 7 and simultaneously through the compression stage of the valve arrangement 57 into the equalisation chamber 56. On rebounding, the damping fluid flows through the rebound stage of the valve arrangement 57 which has no or only a minimal spring force, from the equalisation chamber 56 back into the working space 6 and from the workings space 6 through the rebound stage of the piston 5 of the absorber unit 3 back into the working space 7.

The damping behaviour can further advantageously be adapted by way of adjusting the respective bypass channel in the piston rod 4 or in the valve arrangement. A sporty, firm tuning is achieved by way of closed bypass channels and the travel comfort is increased by way of opened bypass channels.

The working spaces 6, 7 are separated from one another, so that given a closed bypass channel 60 which is arranged in the piston rod 4, the damping fluid can flow exclusively via the piston member flow channels 11 from the one into the other working space 6, 7.

Figure 6:
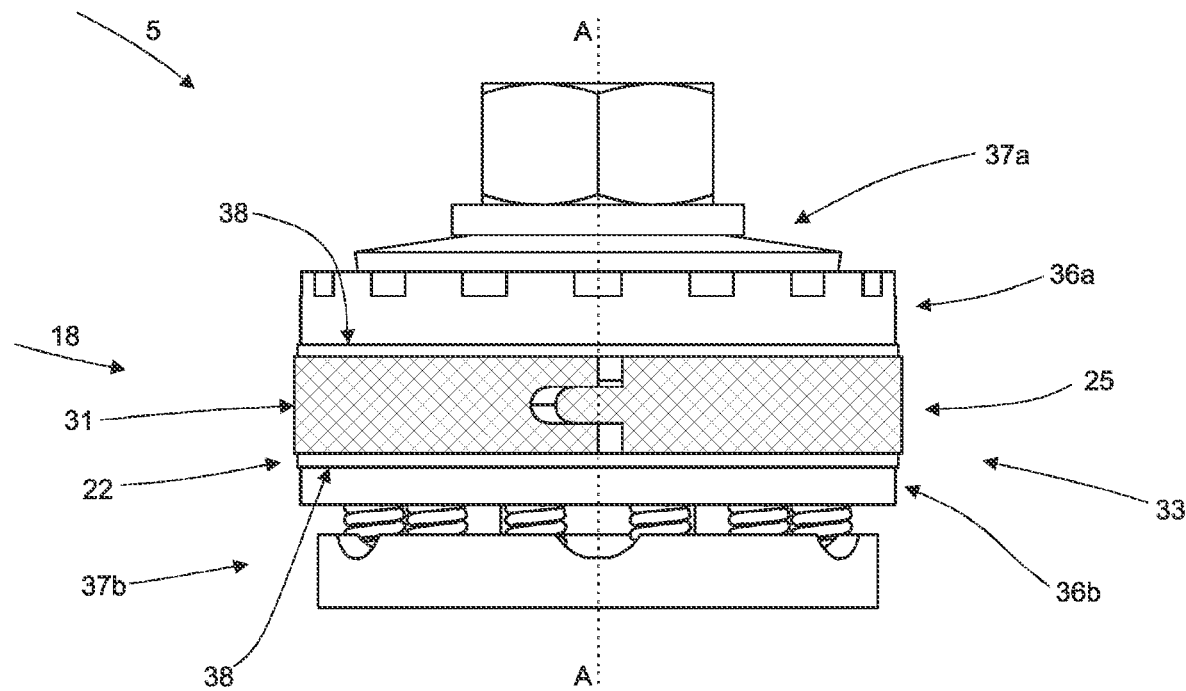

FIG. 6 represents a lateral view of the put-together piston 5 of the absorber unit 3 of the preferred hydraulic shock absorber 1. The piston sealing ring 25 is arranged in the piston sealing ring receiver space 28 of the piston support ring 22, so that the piston ring 28 which is designed in a multi-part manner, comprising the piston support ring 22 and the piston sealing ring 25 is arranged on the piston member 8 which is not shown, in a coaxial and displaceable manner.

A pressure plate 36 which comprises pressure plate flow channels 22 is arranged axially on both sides of the piston unit 33 and is resiliently biased against the piston unit 33, preferably against the piston member 8, by way of a spring force of a spring element 37, so that the piston unit 33 which comprises the piston ring 18 which is arranged on the piston member 8 in a coaxial and displaceable manner and which comprises a piston ring outer lateral surface 31 is arranged between the pressure plates 36.

The pressure plates 36 are herein radially dimensioned such that a piston ring end-face 38 which faces the pressure plates 36 projects radially beyond the assigned pressure plate 36 in a manner such that in the operating state, the piston ring 18 is displaceable by way of the damping fluid which pressed upon the one piston ring end-face 38 and the pressure plate 36 at the other side is deflected against the spring force by way of the displacement of the piston ring 18, by which means a flow path through the piston member flow channels 11 and the pressure plate flow channels 35 of the pressure plate 36 on the other side can be released for the throttled flow of the damping fluid between the two working spaces 6, 7.

In the embodiment example of a cylinder-shaped hydraulic shock absorber, an annular gap therefore forms between the housing 2 and the pressure plate 36, the base surface of said annular gap being designed as part of the piston ring end-face 38.

Figure 7:
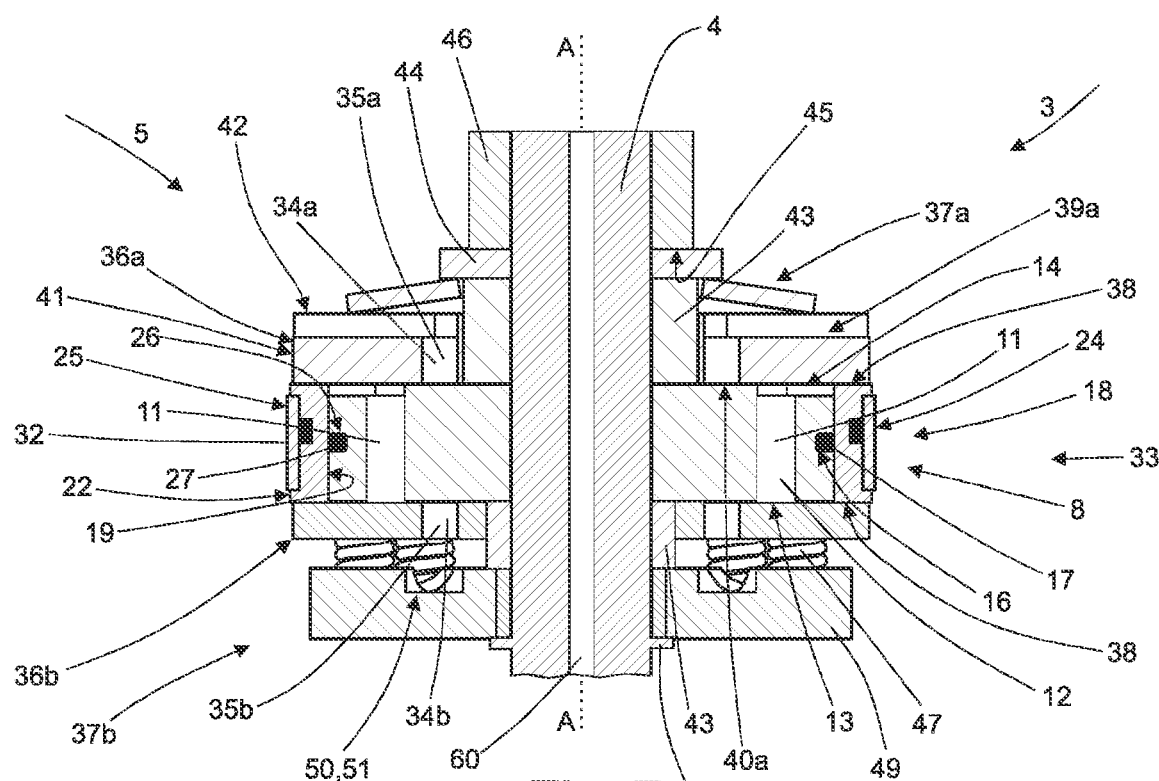

FIG. 7 shows a representation of the piston 5 of the absorber unit 3 of the preferred hydraulic shock absorber 1 according to FIG. 6 in a longitudinal section through a section plane B which runs through the absorber unit middle axis A-A, wherein the piston is arranged on the piston rod 4.

The piston 5 comprises the piston member 8, said piston member comprising a multitude of piston member flow channels 11 which are suitable for the connection of the first and second working space 6, 7 and is stationary with respect to the piston rod 4, and a multi-part piston ring 18, said piston ring being arranged coaxially on the piston member 8 in a displaceable manner in the axis direction of the absorber unit middle axis A-A and comprising a piston ring inner lateral surface 19. The piston member seal element 17 which is arranged in the piston member groove 16 hereby seals between the piston member 8 and the piston ring 18.

Hereby, the piston unit 33 comprises the piston member 8 and the piston ring 18.

The piston member flow channels 11 are designed in the form of a bore 12 and comprise a piston member flow channel inlet section 14 and a piston member flow channel outlet section 13.

The piston ring 18 is designed in a multi-part manner and comprises the piston support ring 22 and the piston sealing ring 25. The piston ring seal element 27 is arranged between the piston support ring 22 and the piston sealing ring 25.

The piston sealing ring outer lateral surface 24 is coated with the sealing material 32 which seals between the housing 2 which is not shown here and the piston sealing ring 25.

A pressure plate 36 which comprises pressure plate flow channels 35 is arranged axially on both sides of the piston unit 33, said piston unit comprising the piston member 8 which has the piston member outer lateral surface 15a, wherein the pressure plate is resiliently biased against the piston unit 33, preferably however against the piston member 8, by way of a spring force of the spring element 37, so that the piston ring 18 is arranged between the pressure plates 35.

The pressure plates 36 are radially dimensioned such that a piston ring end-face 38 which faces the pressure plates 36 in each case projects radially beyond the assigned pressure plate 36. By way of this, in the operating state the piston ring 8 is displaceable by the damping fluid which pressed upon the one piston ring end-face 38, and the pressure plate 36 on the other side is deflected against the spring elements 37 which exert the spring force upon the pressure plates 36, by way of the displacement of the piston ring 8. Hence a flow path for the throttled flow of the damping fluid between the two working spaces 6, 7 is formed through the piston member flow channels 11 and the pressure plate flow channels 35 of the pressure plate 36 on the other side.

The pressure plate 36a comprises pressure plate flow channels 35a which are designed as a bore 34a and which comprise an axial pressure plate flow channel outlet section 39b and axial pressure plate flow channel inlet section 40a which is not shown here. The pressure plate flow channel outlet section 39a is hereby open towards a pressure plate outer lateral surface 41 of the pressure plate 36a and towards a pressure plate end-face 42 which is away from the piston member 8.

The pressure plate 36b comprises pressure plate flow channels 35b which are designed as a bore 34b.

The pressure plate flow channel 35 can be designed in the most varied of shapes and also be able to be designed or is designed as a pressure plate flow groove in the pressure plate outer lateral surface 41.

The pressure plate flow channels 35a and 35b are arranged in the pressure plates 36a and 36b in a manner such that the piston member flow channels 11 are sealed with respect to the piston member end-faces 9, 10 which face the pressure plates 36a and 36b.

The spring element 37 is distanced to the piston member 8 by way of a spacer sleeve 43, for limiting the biasing of the pressure plate 36. In the embodiment example, two different spring elements 37a and 37b are applied for biasing the pressure plates 36a and 36b. The spring element 37a is designed as a disc spring. The spring element 37a is fixed with respect to the piston rod 4 which is not shown, by way of a washer 44 and a nut 44 which serves as a stop 45.

The spring element 37b is designed in a multi-part manner and in the embodiment example comprises twelve helical springs 47, a spacer sleeve 43 and a support plate 49 which comprises support plate flow channels 48 which are not shown here.

Receivers 51 which are designed as blind holes 50 and which partly receive the helical springs 47 and position them relative to the pressure plate 36b are formed in the support plate 49. The receivers 51 are arranged equally distributed in the circumferential direction about the absorber unit middle axis A-A in the manner of a bolt circle.

Furthermore, the bypass channel 60 which connects the two workings spaces 6, 7 is shown in FIG. 7.

Figure 8:
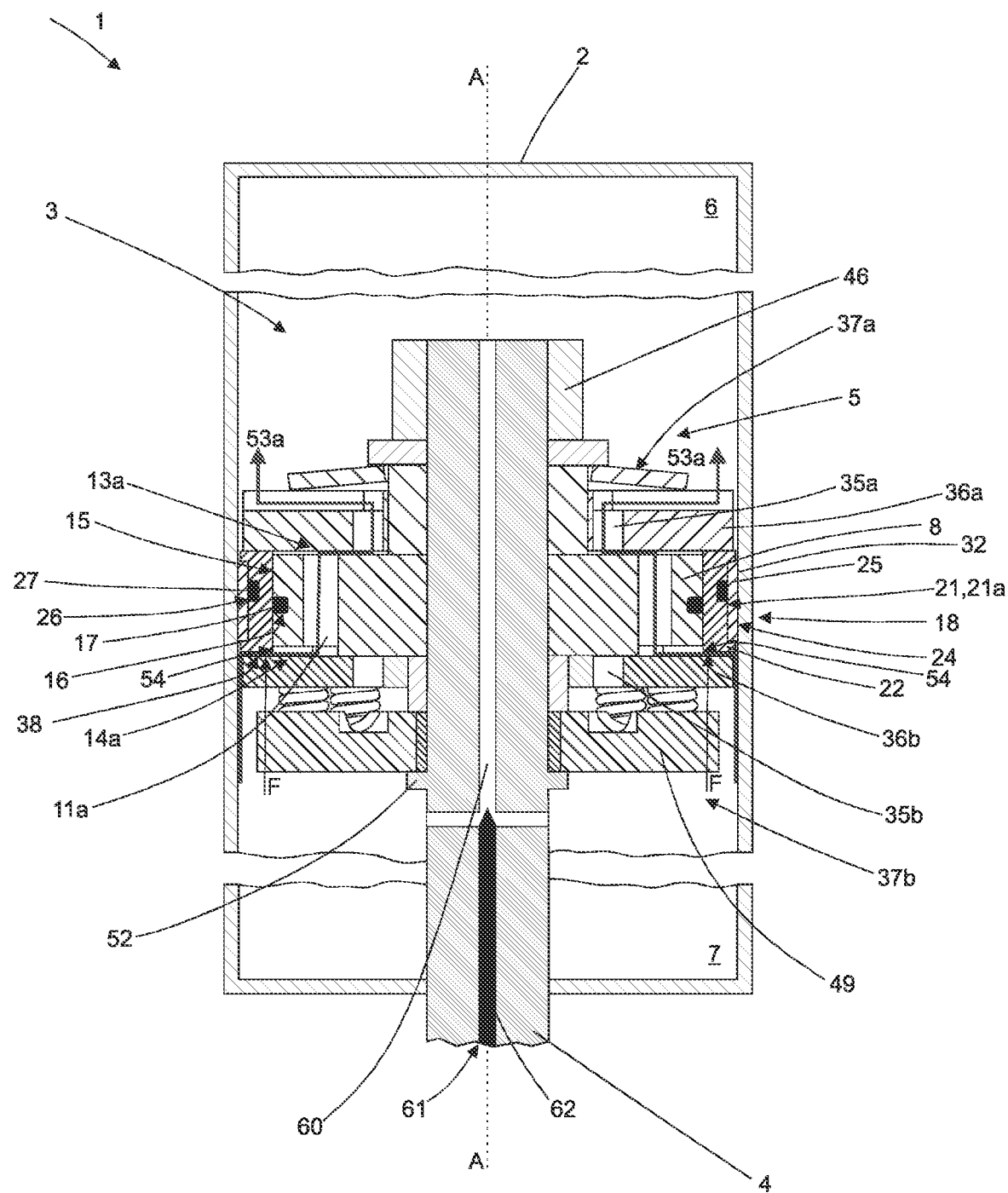

A representation of the preferred hydraulic shock absorber 1 in a longitudinal section though a section plane B which runs through the absorber unit middle axis A-A, with a flow path which is marked in the flow direction of a damping fluid between the second working space 7 and the first working space 6 is shown in the operating state in FIG. 8.

The absorber unit 3 which comprises the piston rod 4 and the piston 5 is arranged in the housing 2 of the hydraulic shock absorber 1 in a displaceable manner in the axis direction of the absorber unit middle axis A-A. The piston 5 comprises the piston member 8 which is stationary with respect to the piston rod 4. The piston ring 18 which in the embodiment example is designed in a multi-part manner is arranged on the piston member 8 in a coaxial manner in which it is displaceable in the axis direction of the absorber unit middle axis A-A. The piston seal element 17 which seals between the piston member 8 and the piston ring 18 is arranged between the piston member 8 and the piston ring 18, in a piston member groove 16 which is formed on the piston member outer lateral surface 15.

The piston ring 18 which is designed in a multi-part manner, in the embodiment example of FIG. 8 comprises the piston support ring 22 and the piston sealing ring 25. The piston seal element 27 which seals between the piston support ring 22 and the piston sealing ring 25 is arranged between the piston support ring 22 and the piston sealing ring 25, in a piston ring groove 26 which is formed on the piston support ring outer lateral surface 21, or to be more precise on the inner piston support ring outer lateral surface 21a.

The piston sealing ring outer peripheral surface 24 of the piston sealing ring 25 is coated with sealing material 32, in particular PTFE, PFA, FEP, ETFE and/or PVDF or the like, so that a sealing is produced between the piston sealing ring 25 and the housing 2.

In particular, the piston 5 of the hydraulic shock absorber 1 which comprises the piston member 8, the piston ring 18 and the piston sealing ring 25 has a double function, wherein the piston 5 is designed as a switch between the rebound stage and compression stage and as a guide in the housing 2 of the hydraulic shock absorber 1. In particular, the piston sealing ring 25 already switches before the damping fluid flows on account of the friction force with respect to an inner wall of the housing 2 and releases the respective piston member flow channels 11a or the piston member flow channels 11b for the damping fluid in the respective axis direction. Almost simultaneously to this, a movement of the piston ring 18 is initiated by way of a force upon the piston ring end-face 38 of the piston ring 18 which acts due to the damping fluid, by which means either the piston member flow channels 11a or the piston member flow channels 11b are released, so that by way of this, the throttled flow of the damping fluid from the working space 6 to the working space 7 or vice versa is increased. The pressure plate 36 on the other side is deflected by the piston ring 18. Preferably, different piston member flow channels 11a and 11b are present for the throttle flow of the piston member 8 of the piston 5 in the respective axis direction of the flow of the damping fluid. The damping counteracts the overshooting of the shock absorber. The compression stage is responsible for the springing-in and rebound stage for the springing-out.

The piston member flow channels 11 which penetrate through the piston member 8 comprise the piston member flow channel outlet section 13 and the piston member flow channel inlet section 14. In FIG. 8, the piston member flow channels 11a are represented, and in the operating state these release a flow path which permits a flow of the damping fluid from the second working space 7 into the first working space 6.

The piston member 8 and the piston ring 18 which is arranged coaxially on the piston member 8 in a displaceable manner are arranged between the pressure plates 36 which comprise pressure plate flow channels 35. The pressure plates 36 are hereby biased against the piston member 8 by way of spring elements 37 which exert a spring force. The support plate 49 of the spring element 37b is hereby fixed by the stop 52.

The biasing which acts upon the pressure plates 36 can be infinitely adjusted by the nut 46.

If now the absorber unit 3 is displaced in the axis direction of the absorber unit middle axis A-A in the direction of the second working space 7 due to an impact acting upon the hydraulic shock absorber 1, damping fluid flows from the second workings space 7 into the first working space 6. The flow path of the damping fluid in the piston 5 is explained hereinafter.

The damping fluid of the second working space 7 given the aforementioned impact upon the hydraulic shock absorber 1 exerts a force upon the piston ring end-face 38 and displaces this axially in the direction of the working space 6. In the operating state, given a displacement of the absorber unit 3 in the axis direction of the absorber unit middle axis A-A in the direction of the working space 7, said absorber unit comprising the piston rod 4 and the piston 5 which is arranged on this, the damping fluid flows from this second working space into the first working space 6.

In the operating state, the piston ring 18 is displaced by a force F due to the damping fluid which presses upon the one piston ring end-face 38, and the pressure plate 36a on the other side is defected against the spring force by way of the displacement of the piston ring 18, by which means a flow path 53a characterised by the arrow, for the throttled flow of the damping fluid between the two workings paces 6, 7 is released through the piston member flow channels 11a and the pressure plate flow channels 35a of the pressure plate 36a on the other side.

The greater the force F, the greater the displacement of the piston ring 18 against the biased pressure plate 36a on the other side. Thus, with an increasing force, an inlet area 54 for the piston member flow channel inlet section 14a and which is larger in cross-sectional area forms on the piston member outer lateral surface 15. Due to this, a larger flow volume of the damping fluid can flow through the piston member flow channel 11a due to the acting larger force F. The increase of the flow volume of the damping fluid is limited by the piston member flow channel cross-sectional area.

Figure 9:
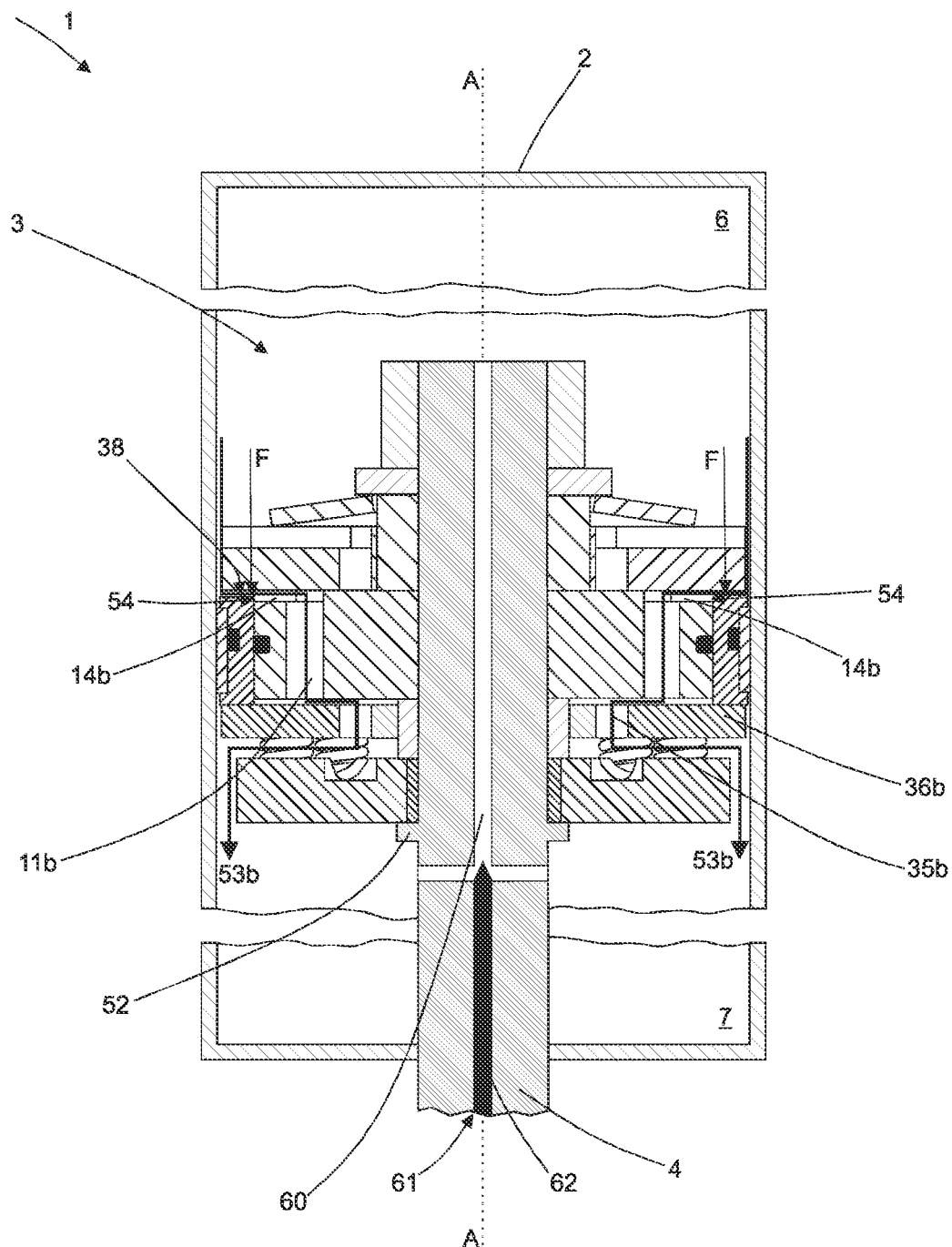

A representation of the preferred hydraulic shock absorber 1 is shown in the operating state in FIG. 9 in a longitudinal section through a section plane B which runs through the absorber unit middle axis A-A, with a flow path between the first working space 6 and the second working space 7, said flow path being marked in the flow direction of a damping fluid.

In contrast to the flow path 53a which is shown in FIG. 8, in the operating state and given a displacement of the absorber unit 3, comprising the piston rod 4 and the piston 5 which is arranged on this, in the axis direction of the absorber unit middle axis A-A in the direction of the first working space 6, the damping fluid flows from this into the second workings space 7.

In the operating state, the piston ring 18 is displaced by a force F by the damping fluid which presses upon the piston ring end-face 38 and the pressure plate 36b on the other side is deflected against the spring force due to the displacement of the piston ring 18, by which means a flow path 53b which is characterised by the arrow for the throttled flow of the damping fluid between the two workings spaces 6, 7 is released through the piston member flow channels 11b and the pressure plate flow channels 35b of the pressure plate 36b on the other side.

The larger the force F, the greater is the displacement of the piston ring 18 against the biased pressure plate 36b on the other side. Hence with an increasing force, an inlet area 54 which is larger in cross section forms on the piston member outer lateral surface 15 for the piston member flow channel inlet section 14b. On account of this, a larger volume flow of the damping fluid can flow through the piston member flow channel 11b by way of the acting larger force F. The increase of the volume flow of the damping fluid limited by the piston member flow channel cross-sectional area. FIGS. 8 and 9 furthermore show a bypass channel 60 in the absorber unit 3 of the hydraulic shock absorber 1, said bypass channel being formed in the piston rod 4. The flow through the bypass channel 60 can be adjusted by way of a valve 61, preferably a needle valve. If the bypass channel 60 which is arranged in the piston rod 4 is closed, then a degressive characteristic line and a maximal possible rebound damping is achieved. The damping is effected via the preset spring elements 37 and the throughflow of the damping fluid at the piston 5. A sporty, firm tuning of the rebound stage results from this, which helps in the control of pitching and rolling movements of the vehicle. If the bypass channel 60 which is arranged in the piston rod 4 is opened, then a progressive characteristic line and the least possible rebound damping are achieved. The quantity of damping fluid which flows through the bypass channel 60 is no longer available and the damping forces are reduced by way of this. A reduced rebound damping increases the travel comfort.

If the piston 5 of the hydraulic shock absorber 1 springs in, then by way of the plunging of the piston rod 4 the damping fluid which is under pressure is displaced out of the working space 6 and flows via the piston member flow channels 11 into the working space 7 and via the valve arrangement 57 which is preferably designed as a check valve, into a equalisation container 56. In the embodiment example, the valve arrangement 57 and the piston 5 of the absorber unit 3 are designed in a constructionally equal manner, wherein the rebound stage has no spring force. On compressing, the damping fluid flows through the compression stage of the piston 5 of the absorber unit from the workings space 6 into the working space 7 and simultaneously through the compression stage of the valve arrangement 57 into the equalisation container 56. On rebounding, the damping fluid flows through the rebound phase of the valve arrangement 57 which has no or only a minimal spring force, from the equalisation container 56 back into the working space 6 and from the working space 6 through the rebound stage of the piston 5 of the absorber unit 3 back into the working space 7.

The damping behaviour can further advantageously be adapted by way of the adjustment of the respective bypass channel in the piston rod 4 or in the valve arrangement. A sporty, firm tuning is achieved by way of closed bypass channels and the travel comfort is increased by way of opened bypass channels.

The invention claimed is:
1. A hydraulic shock absorber, comprising:
a housing and an absorber unit,
wherein the absorber unit is movable relative to the housing in the axis direction of an absorber unit middle axis A-A and comprises a piston which is arranged on a piston rod and which subdivides the housing into a first and a second working space which is filled with damping fluid,
wherein the piston has a piston unit which comprises a piston member, said piston member comprising a multitude of piston member flow channels which are suitable for the connection of the first and second working space and being stationary with respect to the piston rod, and a piston ring, said piston ring being coaxially arranged on the piston member in a displaceable manner in the axis direction of the absorber unit middle axis A-A and comprising a piston ring inner lateral surface,
wherein a pressure plate which comprises pressure plate flow channels is arranged axially on both sides of the piston unit, said piston unit comprising the piston member which has a piston member outer lateral surface, and is resiliently biased against the piston unit by way of a spring force, so that the piston ring which comprises a piston ring outer lateral surface is arranged between the pressure plates and the piston member flow channels are sealed off with respect to piston member end-faces facing the pressure plates, and
wherein the pressure plates are radially dimensioned such that a piston ring end-face which faces the pressure plates projects radially beyond the assigned pressure plate in a manner such that in the operating state the piston ring of the piston unit is displaceable by the damping fluid which presses upon the one piston ring end-face and the pressure plate on the other side is deflected against the spring force by way of the displacement of the piston ring, by which means a flow path through the piston member flow channels and the pressure plate flow channels of the pressure plate on the other side can be released for the throttled flow of the damping fluid between the two workings spaces.

2. The hydraulic shock absorber according to claim 1, wherein a pressure plate which comprises pressure plate flow channels and which is resiliently biased against the piston member by way of a spring force is arranged axially on both sides of the piston unit, said piston unit comprising the piston member which has a piston member outer lateral surface.

3. The hydraulic shock absorber according to claim 1, wherein the piston member and the piston ring are manufactured of different materials and/or the piston ring is designed in a multi-part manner.

4. The hydraulic shock absorber according to claim 1, wherein the piston ring comprises a piston support ring which has a piston support ring inner lateral surface and a piston support ring outer lateral surface, and a piston sealing ring which has a piston sealing ring inner lateral surface and a piston sealing ring outer lateral surface.

5. The hydraulic shock absorber according to claim 4, wherein a piston ring seal element for sealing between the piston support ring and the piston sealing ring is arranged in a piston ring groove which is formed in the piston support ring outer lateral surface or in the piston sealing ring inner lateral surface.

6. The hydraulic shock absorber according to claim 4, wherein an inner piston support ring outer lateral surface is set back with respect to an outer piston support ring outer lateral surface, so that a piston sealing ring receiver space opens out, in which space the piston sealing ring is arranged.

7. The hydraulic shock absorber according to claim 6, wherein the piston sealing ring comprise a wall, wherein the wall has a wall thickness, so that the piston ring forms a plane piston ring outer lateral surface by way of the outer piston support ring outer lateral surface and the piston sealing ring outer lateral surface which are arranged to one another.

8. The hydraulic shock absorber according to claim 4, wherein a piston member seal element for sealing between the piston member and the piston support ring is arranged in a piston member groove which is formed in the piston member outer lateral surface or in the piston support ring inner lateral surface.

9. The hydraulic shock absorber according to claim 1, wherein the piston sealing ring outer lateral surface is coated with a sealing material for sealing with respect to the housing.

10. The hydraulic shock absorber according to claim 1, wherein a piston member seal element for sealing between the piston member and the piston ring is arranged in a piston member groove which is formed in the piston member outer lateral surface or in the piston ring inner lateral surface.

11. The hydraulic shock absorber according to claim 1, wherein the piston member flows channels are arranged in an equally distributed manner in the circumferential direction about the absorber unit middle axis A-A and/or that the piston member flow channels are designed as a bore.

12. The hydraulic shock absorber according to claim 1, wherein the pressure plate flow channels are arranged in an equally distributed manner in the circumferential direction about the absorber unit middle axis A-A and/or the pressure plate flow channels are designed as a bore.

13. The hydraulic shock absorber according to claim 1, wherein the pressure plates are resiliently biased against the piston unit by way of one or more spring elements.

14. The hydraulic shock absorber according to claim 13, wherein the one or more spring elements are designed as compression springs, flat springs and/or corrugated springs.

15. The hydraulic shock absorber according to claim 13, wherein the one or more spring elements are distanced to the piston member by way of a spacer sleeve, for limiting the biasing of the pressure plate.

16. The hydraulic shock absorber according to claim 1, wherein the piston ring has an axial play between the pressure plates.

17. The hydraulic shock absorber according to claim 1, wherein at least a portion of the multitude of piston member flow channels are constructionally separate from one another, for the flow path for the throttled flow of the damping fluid in a flow direction between the two working spaces and/or at least a portion of the multitude of the piston member flow channels comprise an axial piston member flow channel outlet section and an axial piston member flow channel inlet section, wherein the piston member flow channel inlet section is open towards the piston member outer lateral surface.

18. The hydraulic shock absorber according to claim 1, wherein a piston member flow channel is designed as a piston member flow groove in the piston member outer lateral surface and/or the pressure plate flow channels comprise an axial pressure plate flow channel outlet section and an axial pressure plate flow channel inlet section, wherein the pressure plate flow channel outlet section is open towards a pressure plate outer lateral surface.

19. A hydraulic shock absorber, comprising:
a housing and an absorber unit,
wherein the absorber unit is movable relative to the housing in the axis direction of an absorber unit middle axis A-A and comprises a piston which is arranged on a piston rod and which subdivides the housing into a first and a second working space which is filled with damping fluid,
wherein the piston has a piston unit which comprises a piston member, said piston member comprising a multitude of piston member flow channels which are suitable for the connection of the first and second working space and being stationary with respect to the piston rod, and a piston ring, said piston ring being coaxially arranged on the piston member in a displaceable manner in the axis direction of the absorber unit middle axis A-A and comprising a piston ring inner lateral surface,
wherein a pressure plate which comprises pressure plate flow channels is arranged axially on both sides of the piston unit, said piston unit comprising the piston member which has a piston member outer lateral surface, and is resiliently biased against the piston unit by way of a spring force, so that the piston ring which comprises a piston ring outer lateral surface is arranged between the pressure plates,
wherein the pressure plates are radially dimensioned such that a piston ring end-face which faces the pressure plates projects radially beyond the assigned pressure plate in a manner such that in the operating state the piston ring of the piston unit is displaceable by the damping fluid which presses upon the one piston ring end-face and the pressure plate on the other side is deflected against the spring force by way of the displacement of the piston ring, by which means a flow path through the piston member flow channels and the pressure plate flow channels of the pressure plate on the other side can be released for the throttled flow of the damping fluid between the two workings spaces, and wherein a piston member seal element for sealing between the piston member and the piston ring is arranged in a piston member groove which is formed in the piston member outer lateral surface or in the piston ring inner lateral surface.

20. A hydraulic shock absorber, comprising:

a housing and an absorber unit, wherein the absorber unit is movable relative to the housing in the axis direction of an absorber unit middle axis A-A and comprises a piston which is arranged on a piston rod and which subdivides the housing into a first and a second working space which is filled with damping fluid, wherein the piston has a piston unit which comprises a piston member, said piston member comprising a multitude of piston member flow channels which are suitable for the connection of the first and second working space and being stationary with respect to the piston rod, and a piston ring, said piston ring being coaxially arranged on the piston member in a displaceable manner in the axis direction of the absorber unit middle axis A-A and comprising a piston ring inner lateral surface, wherein a pressure plate which comprises pressure plate flow channels is arranged axially on both sides of the piston unit, said piston unit comprising the piston member which has a piston member outer lateral surface, and is resiliently biased against the piston unit by way of a spring force, so that the piston ring which comprises a piston ring outer lateral surface is arranged between the pressure plates, wherein the pressure plates are radially dimensioned such that a piston ring end-face which faces the pressure plates projects radially beyond the assigned pressure plate in a manner such that in the operating state the piston ring of the piston unit is displaceable by the damping fluid which presses upon the one piston ring end-face and the pressure plate on the other side is deflected against the spring force by way of the displacement of the piston ring, by which means a flow path through the piston member flow channels and the pressure plate flow channels of the pressure plate on the other side can be released for the throttled flow of the damping fluid between the two workings spaces, wherein the piston ring comprises a piston support ring which has a piston support ring inner lateral surface and a piston support ring outer lateral surface, and a piston sealing ring which has a piston sealing ring inner lateral surface and a piston sealing ring outer lateral surface, and wherein a piston member seal element for sealing between the piston member and the piston support ring is arranged in a piston member groove which is formed in the piston member outer lateral surface or in the piston support ring inner lateral surface.

21. A hydraulic shock absorber, comprising:

a housing and an absorber unit, wherein the absorber unit is movable relative to the housing in the axis direction of an absorber unit middle axis A-A and comprises a piston which is arranged on a piston rod and which subdivides the housing into a first and a second working space which is filled with damping fluid, wherein the piston has a piston unit which comprises a piston member, said piston member comprising a multitude of piston member flow channels which are suitable for the connection of the first and second working space and being stationary with respect to the piston rod, and a piston ring, said piston ring being coaxially arranged on the piston member in a displaceable manner in the axis direction of the absorber unit middle axis A-A and comprising a piston ring inner lateral surface, wherein a pressure plate which comprises pressure plate flow channels is arranged axially on both sides of the piston unit, said piston unit comprising the piston member which has a piston member outer lateral surface, and is resiliently biased against the piston unit by way of a spring force, so that the piston ring which comprises a piston ring outer lateral surface is arranged between the pressure plates, wherein the pressure plates are radially dimensioned such that a piston ring end-face which faces the pressure plates projects radially beyond the assigned pressure plate in a manner such that in the operating state the piston ring of the piston unit is displaceable by the damping fluid which presses upon the one piston ring end-face and the pressure plate on the other side is deflected against the spring force by way of the displacement of the piston ring, by which means a flow path through the piston member flow channels and the pressure plate flow channels of the pressure plate on the other side can be released for the throttled flow of the damping fluid between the two workings spaces, wherein the pressure plates are resiliently biased against the piston unit by way of one or more spring elements, and wherein the one or more spring elements are distanced to the piston member by way of a spacer sleeve, for limiting the biasing of the pressure plate.

* * * * *